(12) United States Patent
Temple

(10) Patent No.: US 10,155,439 B1
(45) Date of Patent: Dec. 18, 2018

(54) AIR DUCTS FOR AIRFLOW MANAGEMENT, AND ASSOCIATED SYSTEMS AND METHODS

(71) Applicant: Scott Temple, Renton, WA (US)

(72) Inventor: Scott Temple, Renton, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/619,905

(22) Filed: Jun. 12, 2017

(51) Int. Cl.
  B60K 11/00 (2006.01)
  B60K 11/08 (2006.01)
  F01P 1/00 (2006.01)

(52) U.S. Cl.
  CPC ....... B60K 11/085 (2013.01); *F01P 2001/005* (2013.01); *F01P 2025/48* (2013.01)

(58) Field of Classification Search
  CPC ....... B60K 11/085; B60K 11/08; B60K 11/06; F01P 3/18
  See application file for complete search history.

(56) References Cited

U.S. PATENT DOCUMENTS

| | | | | |
|---|---|---|---|---|
| 4,133,185 A * | 1/1979 | Dickey | ................ | B60H 1/3225 123/41.12 |
| 6,695,047 B2 * | 2/2004 | Brocksopp | ................ | F01P 3/18 123/41.04 |
| 9,855,981 B1 * | 1/2018 | Dunford | ................ | B62D 35/00 |
| 2005/0045394 A1 | 3/2005 | Jones | | |
| 2006/0246834 A1 * | 11/2006 | Masumoto | ......... | B60H 1/00378 454/109 |
| 2008/0099261 A1 * | 5/2008 | Sturmon | ................ | B60K 11/08 180/68.1 |
| 2011/0139525 A1 * | 6/2011 | Karl | ....................... | B60K 11/02 180/68.1 |
| 2013/0081887 A1 * | 4/2013 | Tsuchihashi | ........... | B60K 11/06 180/68.1 |
| 2015/0101550 A1 * | 4/2015 | Nam | ..................... | B60K 11/08 123/41.33 |
| 2015/0274104 A1 * | 10/2015 | Schneider | .............. | B60K 11/06 180/68.1 |
| 2017/0082092 A1 * | 3/2017 | Gaither | ..................... | F03D 9/32 |
| 2017/0144533 A1 * | 5/2017 | Gilotte | ................. | B60K 11/085 |

* cited by examiner

*Primary Examiner* — Hau V Phan
(74) *Attorney, Agent, or Firm* — Christensen O'Connor Johnson Kindness PLLC

(57) ABSTRACT

Air ducts for airflow management of the engine compartment, and associated methods are disclosed herein. In one embodiment, an air duct for venting an engine compartment of a tractor includes an inlet that faces the engine compartment, an outlet at an outer surface of a tractor fender, a body of the duct configured generally inside the fender, and one or more shutters that restrict flow of air at the inlet. In some embodiments, the outlet faces a low pressure zone that is downstream of the fender, and a pressure in the low pressure zone depends on a speed of the tractor.

19 Claims, 9 Drawing Sheets

AIR DUCTS FOR AIRFLOW MANAGEMENT, AND ASSOCIATED SYSTEMS AND METHODS

BACKGROUND

Fuel efficiency is a significant element of the overall economics of a road transportation vehicle, e.g., semi-truck ("tractor") with a trailer. Fuel efficiency of the road vehicles is mostly determined by engine efficiency, rolling resistance of the wheels, stop-and-go traffic (i.e., acceleration and deceleration), drag coefficient, and trailer loading. At relatively high and steady velocity, typically referred to as "highway driving," the air flow drag often dominates energy losses of the vehicle. Conversely, at lower speeds or at idle, high temperature in the engine compartment may reduce engine efficiency, and may also increase harmful emissions.

Some conventional technologies attempt to improve the cooling of the engine compartment by installing ducts on the sides of the engine hood for better venting of the engine compartment. FIG. 1A is an example of the conventional technology for the engine compartment venting. The illustrated engine compartment panel 15 has several ducts 1 with side vents 6 that allow hot air to escape from the engine compartment.

FIG. 1B shows a detail of the side vent 6 from FIG. 1A. In operation, when pressure inside the engine compartment exceeds certain predetermined value, a flap 8 bends to allow hot air from the interior of the engine compartment to escape through the side vent 6. In general, higher pressure within the engine compartment bends the flap 8 more, allowing for faster venting of the hot air. When the pressure inside the engine compartment falls below certain design value, the flap 8 bends back to its original position to close the vent 6.

However, the operation of the conventional ducts generally does not relate to the speed of the vehicle or the temperature under the hood, therefore resulting in under-venting or over-venting in comparison to the needed amount of venting and cooling of the engine compartment. Furthermore, with the conventional technology illustrated in FIGS. 1A and 1B, the venting ducts protrude into the engine compartment—generally an already crowded space that is mostly occupied by the engine and the auxiliary systems.

Accordingly, there remains a need for cost- and space-effective venting of the engine compartment that also improves the aerodynamics of the vehicle.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, an air duct for venting an engine compartment of a tractor includes: an inlet that faces the engine compartment; an outlet at an outer surface of a tractor fender; a body of the duct configured through the fender; and one or more shutters configured to restrict a flow of air.

In one aspect, the outlet faces a low pressure zone that is downstream of the fender, and wherein a pressure in the low pressure zone depends on a speed of the tractor.

In another aspect, the shutters allow or restrict the flow of air at least in part based on a pressure in the low pressure zone.

In another aspect, the shutters allow or restrict the flow of air at least in part based on a cross-wind at the tractor.

In one embodiment, a method for venting an engine compartment of a tractor includes: sensing a temperature inside the engine compartment of the tractor; opening one or more shutters of an air duct in response to sensing the temperature; and flowing air from the engine compartment of the tractor through the air duct. The inlet of the air duct faces the engine compartment. The outlet of the air duct is at an outer surface of a tractor fender. A body of the duct passes through the fender.

In one aspect, the outlet of the air duct faces a low pressure zone that is downstream of the fender.

In another aspect, in response to an increased speed of the tractor, an increased amount of air flows through the air duct.

In another aspect, opening one or more shutters is at least in part based on a cross-wind at the tractor.

In one aspect, in response to the cross-wind, the shutters on one fender of the tractor open more than the shutters on the opposite fender of the tractor.

In one aspect, opening one or more shutters is based at least in part on an on/off state of an engine radiator fan.

In one aspect, opening one or more shutters is based at least in part on a speed of the tractor.

In one aspect, the method also includes: controlling the actuator by a controller capable of receiving at least one input from the following list: the temperature inside the engine compartment; a pressure inside the engine compartment; a velocity of a cross-wind; and a speed of the tractor.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention. Briefly, the inventive technology is directed to improved aerodynamics and engine cooling of the highway vehicles, e.g., tractors that pull trailers. In some embodiments, a pair of ducts connect the interior of the engine compartment with a downstream surface of tractor fenders on each side of the tractor. When driving, a low pressure recirculating zone (wake) forms behind the fender, therefore promoting venting of the hot air from the engine compartment. As the speed of the tractor increases, the pressure difference between the interior of the engine compartment (generally corresponding to the pressure at the duct inlet) and the low pressure recirculating zone behind the fender (generally corresponding to the pressure at the outlet of the duct) also increases, therefore improving the venting of the engine compartment. In general, when the engine compartment is vented toward the low pressure recirculating zone, a drag of the tractor is reduced and its aerodynamics is improved.

In some embodiments, shutters are added at the inlet of the ducts. One or more actuators may collectively or independently position the shutters to restrict or open the flow of air. In some embodiments, a controller controls the actuators based on temperature, pressure, cross-wind, and/or tractor speed. When travelling in a cross-wind, the controller may close the shutters at the windward fender to restrict outside air entering the engine compartment, and/or increase opening of the leeward fender to take advantage of the decreased pressure behind the leeward fender.

Figure 1A:
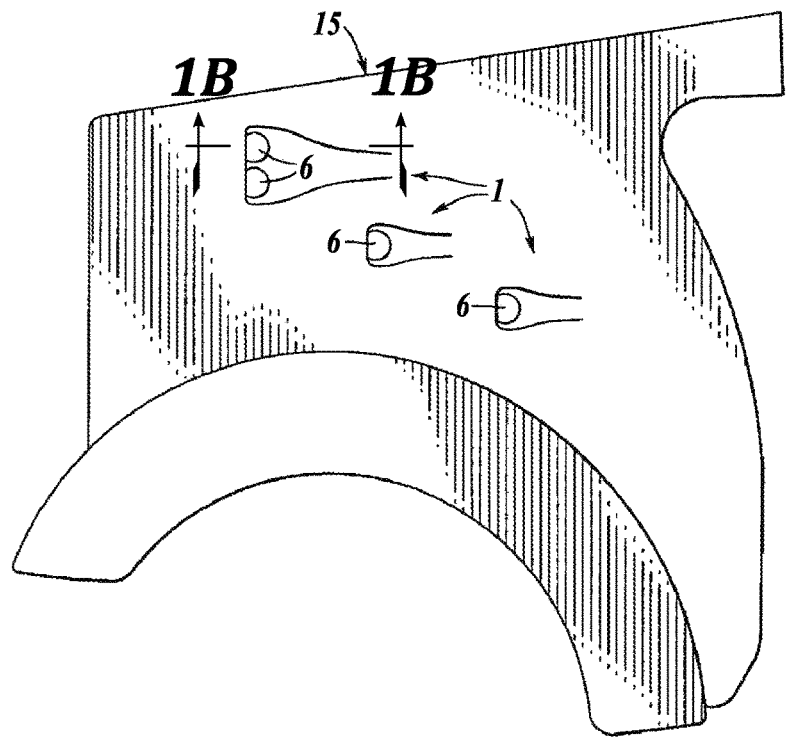
FIG. 1A is a side view of an engine compartment panel having side vents in accordance with conventional technology.
Figure 1B:
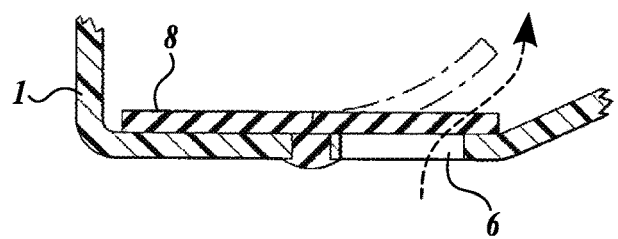
FIG. 1B is a detail of a side vent from FIG. 1A.
Figure 2:
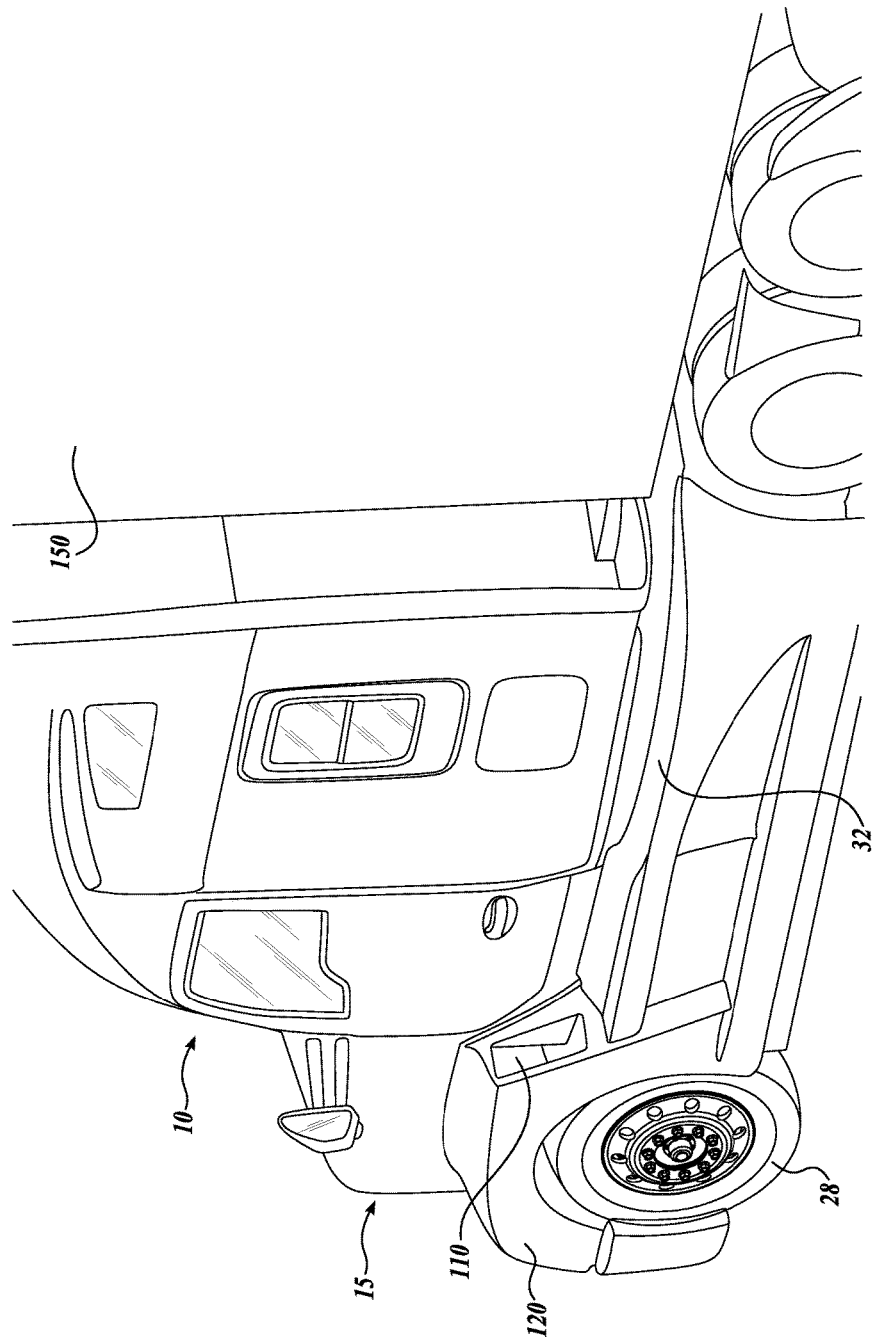
FIG. 2 is an isometric side view of a tractor in accordance with an embodiment of the present technology.

FIG. 2 is an isometric side view of a tractor 10 in accordance with an embodiment of the present technology. The engine compartment is behind panel 15. In some embodiments, fenders 120 that surround tires 28 extend sideways from the engine compartment. In some embodiments, a duct 110 has an outlet that faces downstream from the fender 120. As a result, the outlet faces a low pressure recirculating zone that improves venting of the engine compartment. In some embodiments, the flow of warm air from the duct 110 helps to melt snow or ice over cabin steps 32, therefore enabling an easier or more comfortable access into the driver's cabin.

Figure 3A:
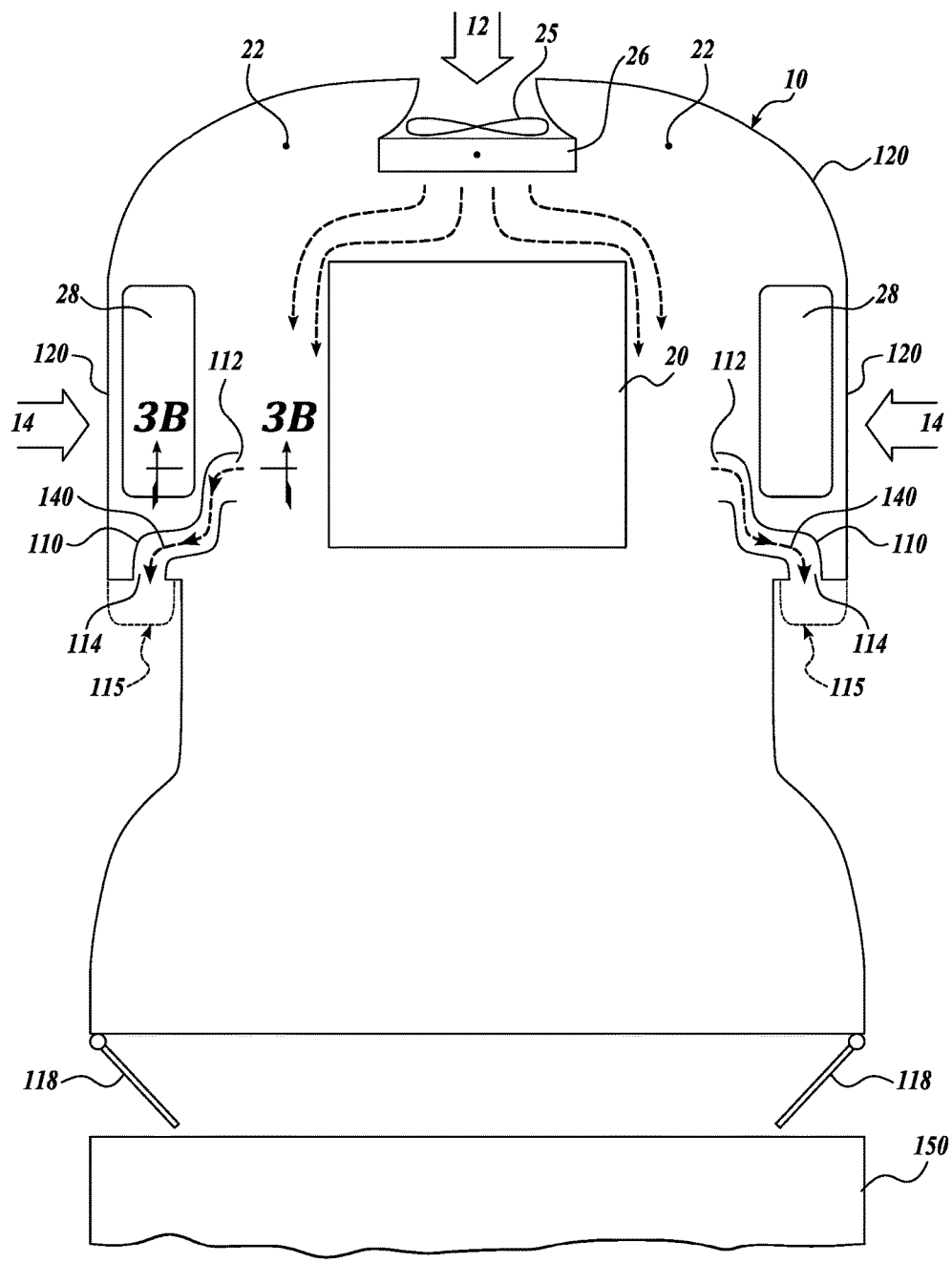
FIG. 3A is a top schematic view of a duct in accordance with an embodiment of the present technology.

FIG. 3A is a top schematic view of the duct 110 in accordance with an embodiment of the present technology. An airflow 12 into an engine compartment 22 increases with the speed of the tractor 10. To improve cooling of a radiator 26 and an engine 20, the radiator may be additionally cooled by a fan 25. Under some use scenarios, the tractor may be subjected to a cross-flow 14. In general, under different driving conditions (e.g., speed, outside temperature, trailer load, road grade, etc.), the temperature and pressure of air in the engine compartment 22 varies. The temperature setpoint for the engine may be partly controlled by airflow 140 through the duct 110.

In some embodiments, the duct 110 is routed through the fender 120 such that a duct outlet 114 faces a low pressure recirculation zone 115 behind the fender 120. In some embodiments, the cross section of the duct outlet 114 is larger than a duct inlet 112 to eliminate or at least reduce flow separation inside the duct, therefore increasing flow through the duct. In some embodiments, the duct 110 is shaped as an NACA foil. In some embodiments the tractor 10 may include one or more portions (e.g., flaps) 118 for closing/opening space between the tractor 10 and a trailer 150 depending on, for example, presence of the cross-wind. The tractor 10 and/or trailer 150 may include other movable portions 118, for example, under the trailer or behind the trailer. The movable portions 118 may be positioned based on the measurements from sensors (e.g., air velocity sensors).

Figure 3B:
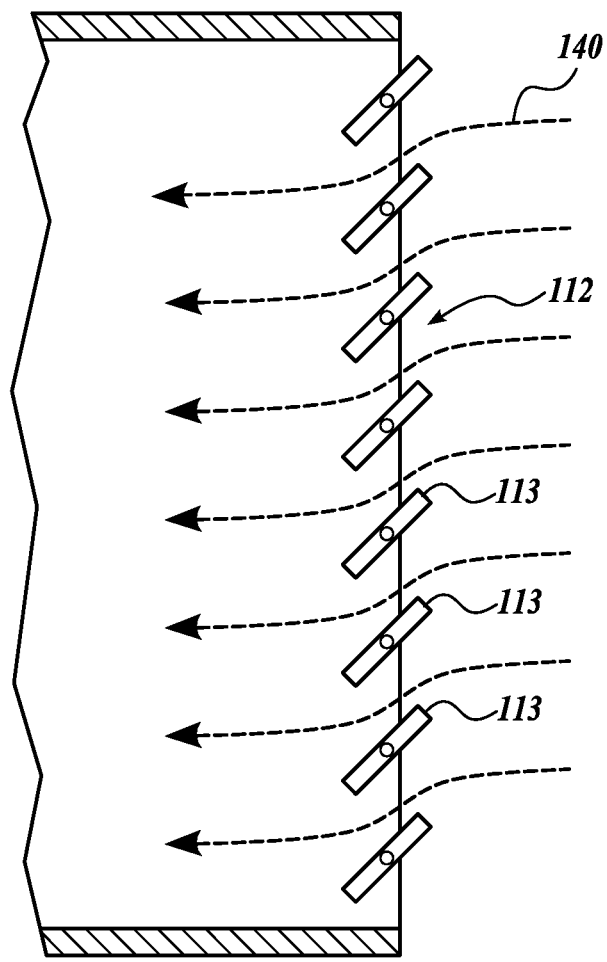
FIG. 3B is a detail of the duct shown in FIG. 3A.

FIG. 3B is a detail of the duct shown in FIG. 3A. In some embodiments, shutters 113 regulate the airflow 140. For example, when the temperature inside the engine compartment is high, the shutters 113 may be opened to improve the venting of the engine compartment. In some embodiments, the shutters 113 may be opened by the increased pressure in the engine compartment (e.g., the shutters may be biased by springs or their own weight). It will be appreciated that the weight or biasing force of the springs may vary in some embodiments, resulting in the shutters 113 having differing shutter positions with respect to the duct inlet 112 when pressure from the engine compartment is applied. Varying such parameters can provide opportunities for optimization based on the vehicle's intended application.

In some embodiments, when a cross-wind 14 is detected, the shutters 113 on the wayward duct 110 may be partially or fully closed to reduce or stop the flow of air into the engine compartment 22. Conversely, the shutters on the leeward duct may be opened more to take advantage of an increased flow recirculation zone at the leeward side of the tractor.

Figure 4:
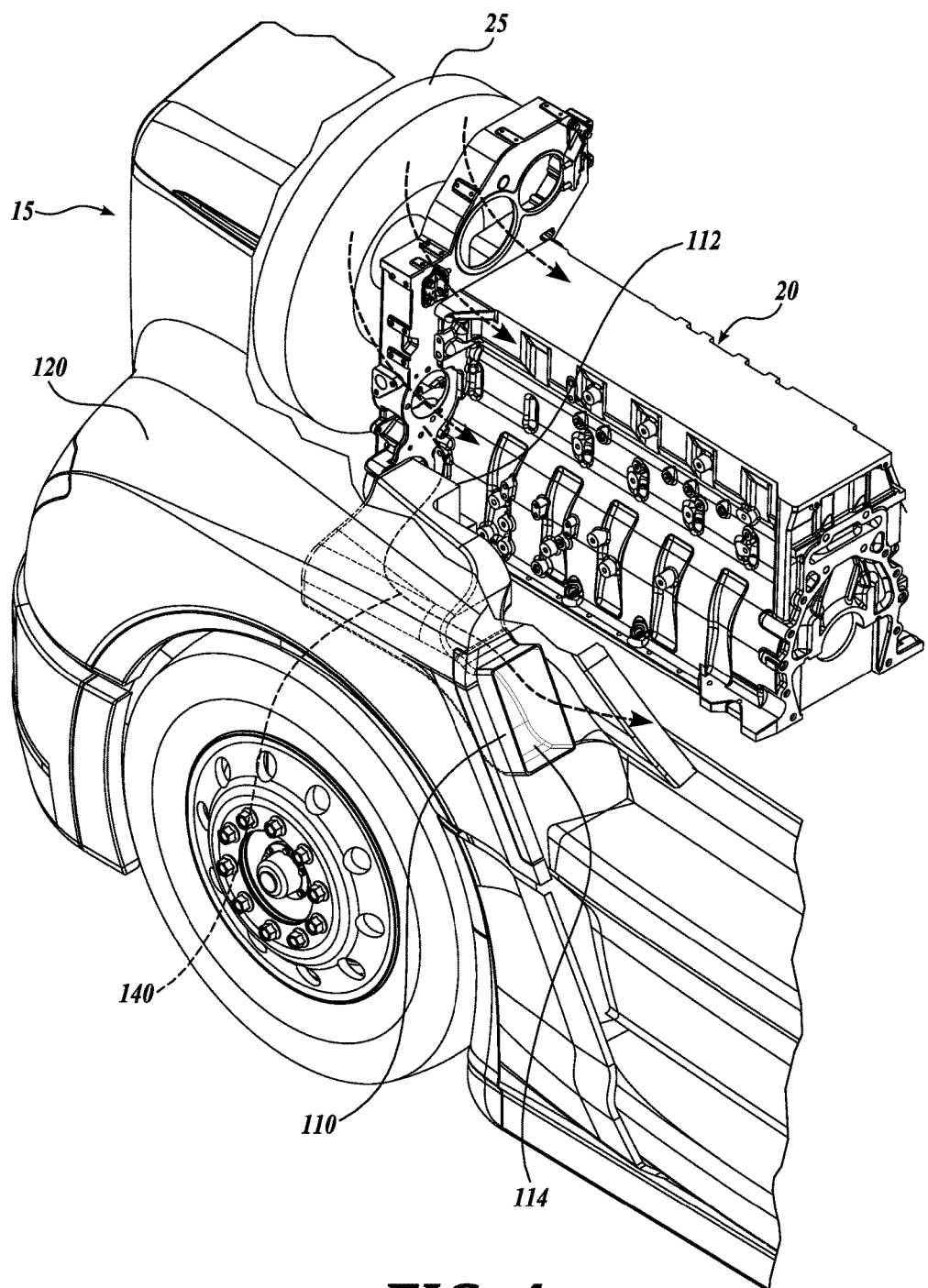
FIG. 4 is an isometric partial view of a tractor in accordance with an embodiment of the present technology.

FIG. 4 is an isometric partial view of a tractor in accordance with an embodiment of the present technology. In some embodiments, since the duct 110 is placed primarily within the fender 120, the space around the engine 20 remains available for, e.g., airflow around the engine or for placement of the auxiliary systems.

Figure 5A:
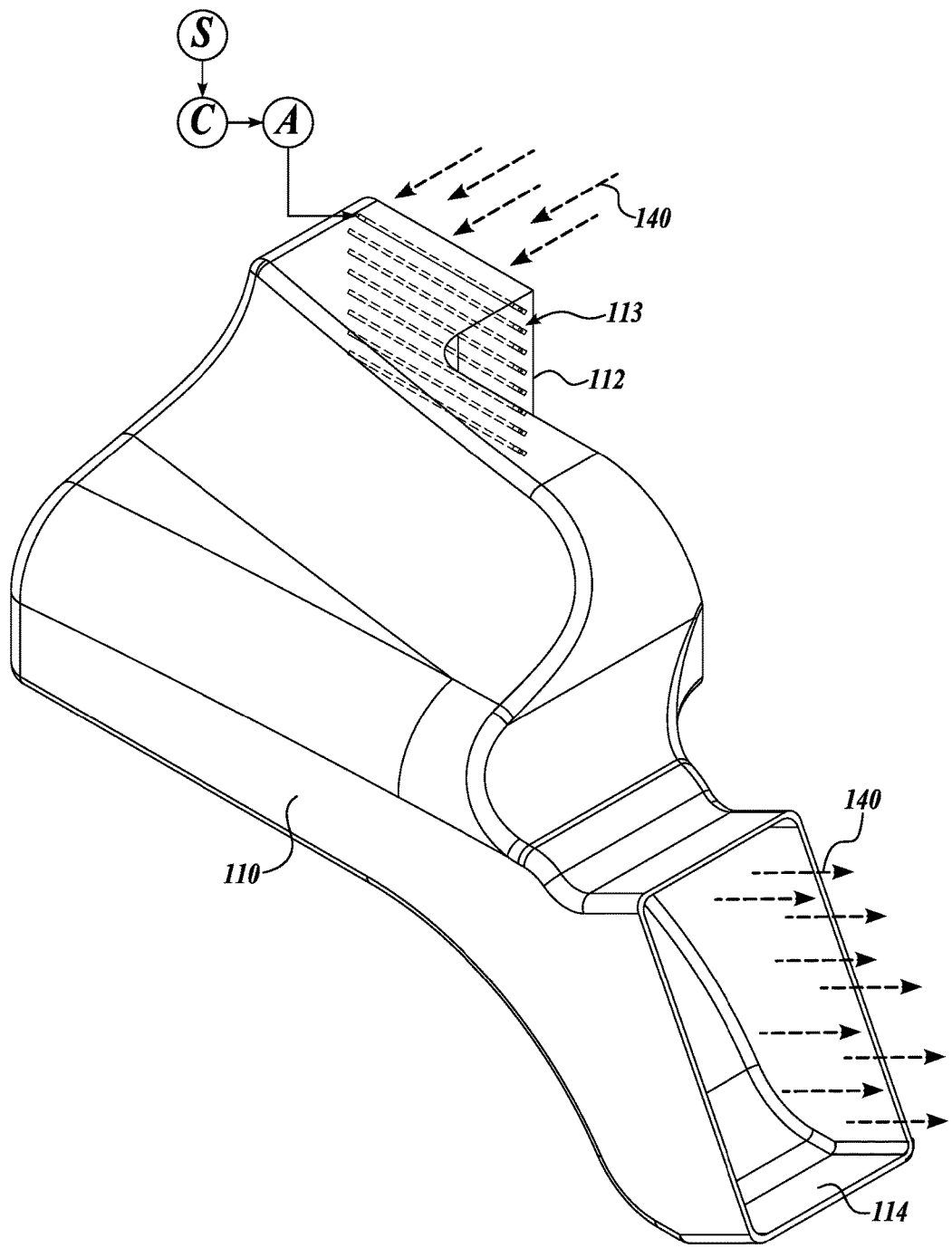
FIGS. 5A and 5B are isometric views of a duct in accordance with an embodiment of the present technology.
Figure 5B:
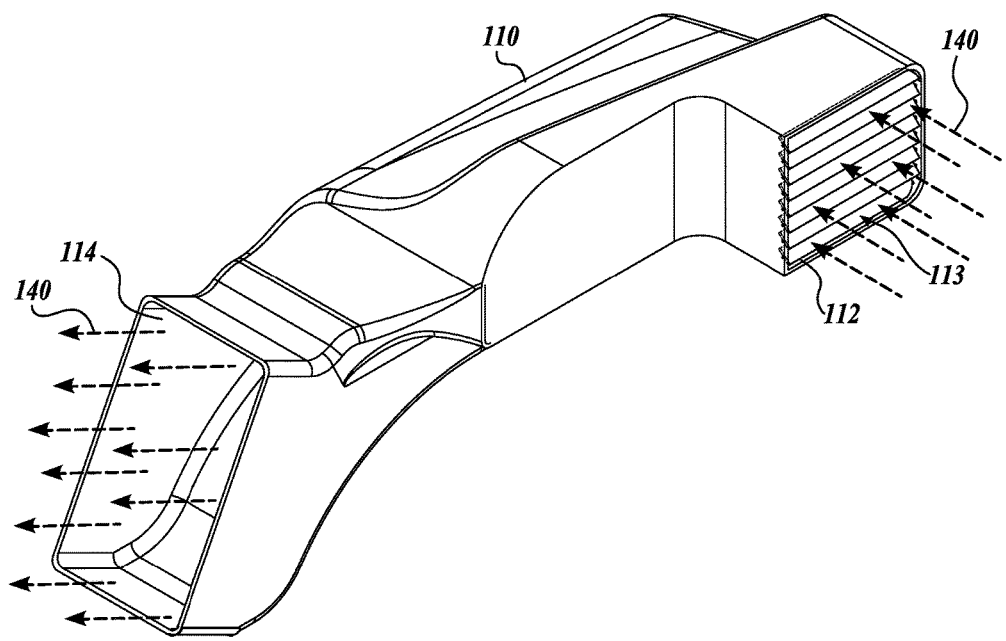

Turning now to FIGS. 5A and 5B, the duct 110 is isometrically depicted in accordance with an embodiment of the present technology. In some embodiments, the shutters 113 are attached (e.g., hinged) to the duct inlet 112. In some embodiments, the shutters 113 can be attached to the fender (not shown) or other parts of the engine compartment. In some embodiments, the shutters 113 can be attached at the duct outlet 114 in addition to or instead of the shutters 113 at the duct inlet 112. In some embodiments, the duct 110 is made of plastic or sheet metal.

In some embodiments, the airflow 140 is controlled by a controller C. For example, the controller C may receive input (e.g., temperature reading, pressure reading, speed of the trailer, strength of the cross-wind, etc.) from one or more sensors S. Based on these inputs, the controller C may drive an actuator A that sets the position of the shutters 113. The actuator A may be an electrical motor, a servo motor, a hydraulic motor, a pneumatic motor, or other suitable actuator. In some embodiments, multiple actuators A may be employed to either collectively or independently set the positions of the shutters 113. In these embodiments, the controller C is configured to control one or more of the actuators A to set the position of one or more of the shutters 113. In some embodiments, position of the shutters 113 can be controlled passively, for example, by bias springs attached to the shutters 113, or through the weight of the shutters.

In some embodiments, the sensors S may provide input to the controller C for controlling other subsystems on the tractor/trailer. For example, based on the input from the sensors S, the controller C may control, for example, radiator fan 25. Furthermore, if the pressure, velocity or temperature sensors S are positioned close to the shutters 113, then in presence of the cross-wind the sensors S generally provide different readings on either side of the tractor/trailer combination. Based on these differential readings, the controller C may open/close the portions 118, or other portions/flaps on the tractor/trailer 10/150.

Figure 6:
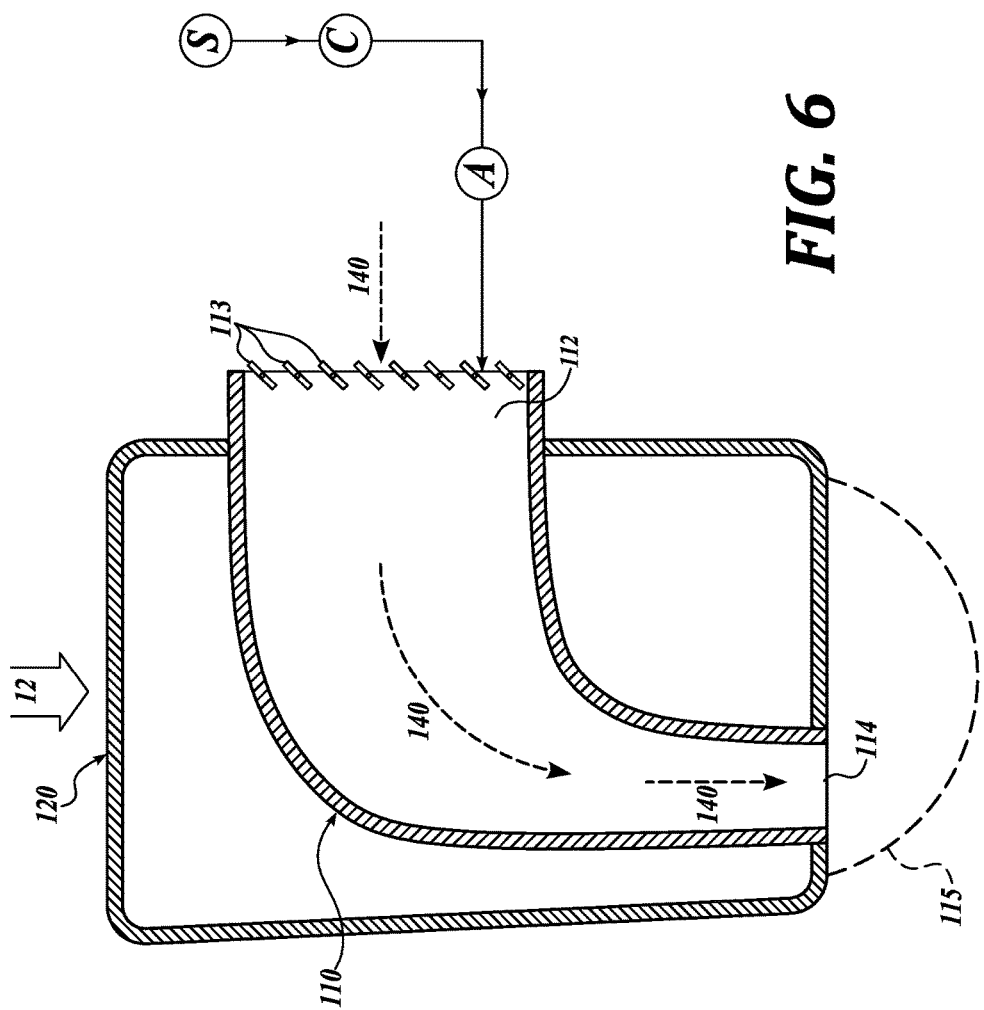
FIG. 6 is a cross-sectional view of a duct in accordance with an embodiment of the present technology.

FIG. 6 is a cross-sectional view of the duct 110 in accordance with an embodiment of the present technology. In some embodiments, the outlet 114 is flush with the fender 120. With some fender designs, the interior of the fender 120 forms a closed space that is readily available to carry the duct 110 without unnecessary interference into the space around the engine 20. In some embodiments, the duct 110 seals an interior of the fender 120 from the airflow 140 to prevent escape of the airflow 140 into the fender 120. In some embodiments, the duct 110 can be shaped as a National Advisory Committee for Aeronautics (NACA) foil to reduce pressure drop and to increase airflow through the duct 110.

Figure 7:
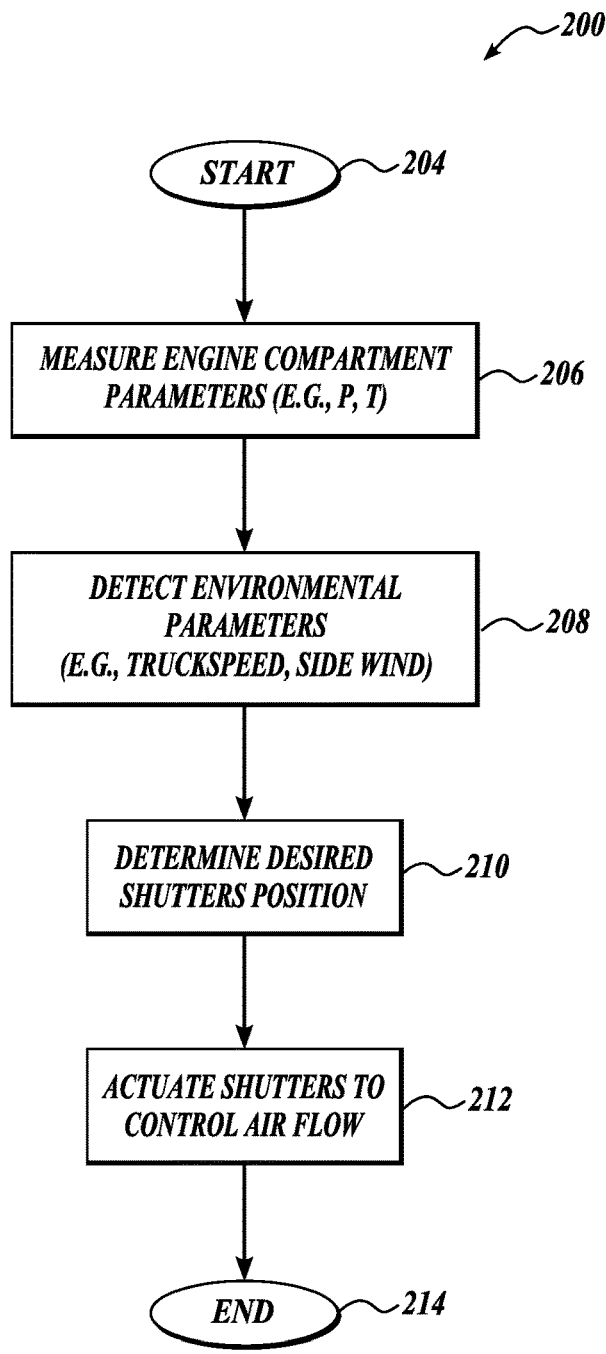
FIG. 7 is a flowchart of a control of engine compartment venting in accordance with an embodiment of the present technology.

FIG. 7 is a flowchart 200 of a representative method of controlling the engine compartment venting in accordance with an embodiment of the present technology. In some embodiments, the method may include only some of the steps in the flowchart, or may include additional steps that are not illustrated in the flowchart 200.

The method starts in step 204 and continues to step 206. In step 206, engine parameters are measured. Some examples of the engine parameters that can be measured include pressure and temperature of the air inside the engine compartment. Other engine parameters may also be measured in embodiments of the present technology. The engine parameters may be measured by suitable sensors.

In step 208, the method detects environmental parameters associated with the vehicle, for example, speed of the tractor, velocity of the cross-wind and the head-wind, etc.

In step 210, a desired position of the shutters is determined. In some embodiments, a controller may determine the desired position of the shutters based on one of the engine compartment parameters or the environmental parameters, or a combination of the engine compartment parameters and the environmental parameters.

In step 212, the one or more actuators open/close the shutters of the air ducts. For example, the controller may cause the one or more actuators to open the shutters more if the temperature in the engine compartment is higher, or less if the temperature is lower. Furthermore, if a cross-wind is present, the controller may cause the shutters to close (or open them less) at the windward duct, and cause the leeward shutters to open (or open them more). The method ends in step 214.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. An air duct for venting an engine compartment of a tractor, comprising:
   an inlet that faces the engine compartment;
   an outlet at an outer surface of a tractor fender;
   a body of the duct configured through the fender; and
   one or more shutters configured to restrict a flow of air,
   wherein the outlet is oriented toward rear end tires of the tractor, wherein the outlet faces a low pressure zone that is downstream of the fender, and wherein a pressure in the low pressure zone depends on a speed of the tractor.

2. The air duct of claim 1, wherein the shutters allow or restrict the flow of air at least in part based on a pressure in the low pressure zone.

3. The air duct of claim 1, wherein the shutters allow or restrict the flow of air at least in part based on a cross-wind at the tractor.

4. The air duct of claim 1, wherein the body of the duct is shaped as a National Advisory Committee for Aeronautics (NACA) profile.

5. The air duct of claim 1, wherein the body of the duct seals an interior of the fender from the flow of air through the duct.

6. The air duct of claim 1, further comprising an actuator configured to actuate the shutters.

7. The air duct of claim 6, wherein the actuator is selected from a group consisting of an electrical motor, a servo motor, a hydraulic motor, and a pneumatic motor.

8. The air duct of claim 6, further comprising:
   a sensor configured to sense a temperature inside the engine compartment; and
   a controller configured to control the actuator based at least in part on the temperature inside the engine compartment.

9. The air duct of claim 6, further comprising:
   one or more sensors configured to sense a first pressure inside the engine compartment and a second pressure outside of the tractor; and
   a controller configured to control the actuator based at least in part on a difference between the first pressure and the second pressure.

10. The air duct of claim 6, wherein the shutters are attached to the inlet of the air duct.

11. A method for venting an engine compartment of a tractor, comprising:
    sensing a temperature inside the engine compartment of the tractor;
    opening one or more shutters of an air duct in response to sensing the temperature; and
    flowing air from the engine compartment of the tractor through the air duct;
    wherein the inlet of the air duct faces the engine compartment, wherein an outlet of the air duct is at an outer surface of a tractor fender, wherein the outlet is oriented toward rear end tires of the tractor, wherein the outlet faces a low pressure zone that is downstream of the fender, wherein a pressure in the low pressure zone depends on a speed of the tractor, and wherein a body of the duct is configured through the fender.

12. The method of claim 11, wherein, in response to an increased speed of the tractor, an increased amount of air flows through the air duct.

13. The method of claim 11, wherein opening one or more shutters is at least in part based on a cross-wind at the tractor.

14. The method of claim 13, wherein, in response to the cross-wind, the shutters on one fender of the tractor open more than the shutters on the opposite fender of the tractor.

15. The method of claim 11, wherein opening one or more shutters is based at least in part on an on/off state of an engine radiator fan.

16. The method of claim 11, wherein opening one or more shutters is based at least in part on a speed of the tractor.

17. The method of claim 11, wherein opening one or more shutters is performed by an actuator, and wherein the actuator is selected from a group consisting of an electrical motor, a servo motor, a hydraulic motor, and a pneumatic motor.

18. The air method of claim 17, further comprising:
controlling the actuator by a controller configured to receive at least one input from a group consisting of:
the temperature inside the engine compartment;
a pressure inside the engine compartment;
a velocity of a cross-wind; and
a speed of the tractor.

19. An air duct for venting an engine compartment of a tractor, comprising:
an inlet that faces the engine compartment;
an outlet at an outer surface of a tractor fender;
a body of the duct configured through the fender;
one or more shutters configured to restrict a flow of air through the duct;
a plurality of flaps configured for closing and opening space between the tractor and a trailer;
one or more sensors configured to sense a first pressure inside the engine compartment and a second pressure outside of the tractor;
a controller configured to receive signals from the one or more sensors and to control at least one actuator, where an output of the controller is based at least in part on a difference between the first pressure and the second pressure; and
the at least one actuator configured to control opening and closing of the one or more shutters based on the output from the controller.

* * * * *